(12) United States Patent
Czegledi et al.

(10) Patent No.: US 12,671,608 B2
(45) Date of Patent: Jun. 30, 2026

(54) LOS-MIMO MICROWAVE RADIO LINK CHANNEL ESTIMATION FOR RANK DEFICIENT CHANNELS

(71) Applicant: Telefonaktiebolaget LM Ericsson (publ), Stockholm (SE)

(72) Inventors: Cristian Czegledi, Gothenburg (SE); Christoffer Fougstedt, Gothenburg (SE); Lei Bao, Gothenburg (SE); Mikael Coldrey, Borås (SE); Martin Malmström, Torslanda (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/851,705

(22) PCT Filed: Mar. 28, 2022

(86) PCT No.: PCT/SE2022/050299
§ 371 (c)(1),
(2) Date: Sep. 27, 2024

(87) PCT Pub. No.: WO2023/191669
PCT Pub. Date: Oct. 5, 2023

(65) Prior Publication Data
US 2025/0202734 A1 Jun. 19, 2025

(51) Int. Cl.
*H04L 25/02* (2006.01)
*H04B 7/0413* (2017.01)
*H04L 1/20* (2006.01)

(52) U.S. Cl.
CPC ....... *H04L 25/0204* (2013.01); *H04B 7/0413* (2013.01); *H04L 1/203* (2013.01)

(58) Field of Classification Search
CPC ... H04L 25/0204; H04L 1/203; H04B 7/0413; H04B 7/0626
See application file for complete search history.

(56) References Cited

U.S. PATENT DOCUMENTS

| | | | |
|---|---|---|---|
| 7,948,444 B2 | 5/2011 | Signell et al. | |
| 9,473,222 B2 | 10/2016 | Rydstrom et al. | |

(Continued)

FOREIGN PATENT DOCUMENTS

| | | |
|---|---|---|
| WO | 2014198286 A1 | 12/2014 |
| WO | 2015110180 A1 | 7/2015 |

(Continued)

OTHER PUBLICATIONS

Zhou, et al., "Low Complexity Millimeter-Wave LOS-MIMO Precoding Systems for Uniform Circular Arrays," IEEE Wireless Communications and Networking Conference, 2014, pp. 1293-1297.

(Continued)

*Primary Examiner* — Jean B Corrielus
(74) *Attorney, Agent, or Firm* — Withrow & Terranova, PLLC

(57) ABSTRACT

A computer-implemented method, performed in a network node for estimating a LOS-MIMO radio propagation channel condition, wherein the LOS-MIMO radio link is arranged to communicate a nominal number of MIMO data streams over the radio link from a first site to a second site, the method comprising configuring the LOS-MIMO radio link to communicate a reduced number of MIMO data streams smaller than the nominal number of MIMO data streams from the first site to the second site over the radio link, transmitting the reduced number of MIMO data streams from the first site to the second site, determining a LOS-MIMO channel phase condition at the second site, based on the reduced number of MIMO data streams transmitted from the first site, communicating the determined LOS-MIMO channel phase condition from the second site to the first site, and estimating the LOS-MIMO radio propagation channel condition at the first site based on the (Continued)

LOS-MIMO channel phase condition communicated from the second site.

14 Claims, 8 Drawing Sheets

(56) References Cited

U.S. PATENT DOCUMENTS

| | | | |
|---|---|---|---|
| 9,893,822 B2 | 2/2018 | Bao et al. | |
| 9,941,941 B2 | 4/2018 | Olsson et al. | |
| 2007/0127586 A1* | 6/2007 | Hafeez | H04B 7/0697 |
| | | | 375/267 |
| 2015/0030091 A1 | 1/2015 | El-Najjar et al. | |
| 2018/0152227 A1 | 5/2018 | Frank et al. | |
| 2019/0020384 A1 | 1/2019 | Kamiya | |
| 2020/0092142 A1* | 3/2020 | Sethi | H04L 25/0236 |
| 2024/0048189 A1* | 2/2024 | Hancharik | H04B 7/0617 |

FOREIGN PATENT DOCUMENTS

| | | | | |
|---|---|---|---|---|
| WO | WO-2015169368 A1 * | 11/2015 | .......... | H04B 7/0617 |
| WO | 2018102163 A1 | 6/2018 | | |

OTHER PUBLICATIONS

International Search Report and Written Opinion for International Patent Application No. PCT/SE2022/050299, mailed Nov. 23, 2022, 12 pages.
Xue, Ye, et al., "Line-of-Sight MIMO for High Capacity Millimeter Wave Backhaul in FDD Systems," Journal of Communications and Information Networks, vol. 5, Issue 2, Jun. 18, 2020, PTP, 15 pages.
Extended European Search Report for European Patent Application No. 22935935.1, mailed Nov. 6, 2025, 13 pages.

* cited by examiner

300

MSE, BER, PER ⟶

Power level, RSS ⟶

Channel phase condition ⟶

Capacity demand ⟶

Number of TX antennas ⟶

Number of RX antennas ⟶

MIMO order decision module

310

320

⟶ Requested number of MIMO streams onset of interference

MIMO stream A ———
MIMO stream B – – – – normal 2x2 MIMO operation temporary 1x2 SIMO operation

2x2 MIMO operation resumed

MSE [dB]

T0        T1        T2        time

500

510

1000

1100

1200

LOS-MIMO MICROWAVE RADIO LINK CHANNEL ESTIMATION FOR RANK DEFICIENT CHANNELS

This application is a 35 U.S.C. § 371 national phase filing of International Application No. PCT/SE2022/050299, filed Mar. 28, 2022, the disclosure of which is incorporated herein by reference in its entirety.

TECHNICAL FIELD

The present disclosure relates to aspects of configuring and operating a line-of-sight (LOS) multiple-input multiple-output (MIMO) microwave radio link. There are disclosed methods as well as network nodes, communication systems, control units, radio transceivers, computer program products and control units for use in LOS-MIMO systems.

BACKGROUND

Point-to-point microwave radio links provide stable data communication at high rate between two fixed locations. They are often used to provide backhaul for radio base stations of a cellular access network, such as the fourth generation (4G) and fifth generation (5G) access networks defined by the third generation partnership program (3GPP). The use of microwave techniques in coming sixth generation (6G) 3GPP systems and beyond is foreseen to be increasingly common.

Microwave point-to-point radio links normally operate over line-of-sight (LOS) propagation channels and may use dual polarization to improve spectral efficiency measured in terms of bits per second and Hertz, bps/Hz, by cross-polar interference cancellation (XPIC) techniques. To further improve spectral efficiency, multiple-input multiple-output (MIMO) techniques may be employed. However, due to the prevailing LOS propagation conditions, the antennas must be carefully positioned in dependence of link distance and carrier frequency to provide the necessary channel rank for MIMO operation. LOS-MIMO techniques for microwave radio links, including aspects of antenna geometry and channel rank, is for instance described in U.S. Pat. No. 7,948,444 B2.

LOS-MIMO operation may in some cases be hampered by intermittent performance degrading factors such as interference from other radio systems and also by changes in relative amplitude and or phase of the radio propagation channel paths between transmitter and receiver antennas, which may occur due to, e.g., atmospheric variations. These performance degradations may in some cases even cause outage in a LOS-MIMO radio link, which of course is undesired. Consequently, there is a need for more robust LOS-MIMO systems that are able to adapt to changes in the operating environment in an efficient manner.

There is also a need for improved methods for characterizing the LOS-MIMO radio propagation channel between transmitter and receiver.

SUMMARY

It is an objective of the present disclosure to provide techniques which resolve or at least alleviate some or all of the above-mentioned issues.

The objective is obtained by a computer-implemented method performed in a network node for estimating a LOS-MIMO radio propagation channel condition. The LOS-MIMO radio link is arranged to communicate a nominal number of MIMO data streams over the radio link from a first site to a second site. The method comprises configuring the LOS-MIMO radio link to communicate a reduced number of MIMO data streams smaller than the nominal number of MIMO data streams from the first site to the second site over the radio link, transmitting the reduced number of MIMO data streams from the first site to the second site, determining a LOS-MIMO channel phase condition at the second site based on the reduced number of MIMO data streams transmitted from the first site, communicating the determined LOS-MIMO channel phase condition from the second site to the first site, and estimating the LOS-MIMO radio propagation channel condition at the first site based on the LOS-MIMO channel phase condition communicated from the second site. This way a LOS-MIMO radio propagation channel condition for transmission of the nominal number of MIMO data streams can be determined by transmitting a reduced number of MIMO data streams. The method is particularly useful when trying to decide if more than the currently transmitted LOS-MIMO data streams can be transmitted over the radio link, i.e., if additional MIMO data streams can be activated or if the MIMO channel conditions does not permit activation of additional MIMO data streams.

The method optionally also comprises a corresponding operation in the reverse direction, i.e., transmitting a reduced number of MIMO data streams from the second site to the first site, determining a LOS-MIMO channel phase condition at the first site, based on the reduced number of MIMO data streams transmitted from the second site, communicating the determined LOS-MIMO channel phase condition from the first site to the second site, and estimating the LOS-MIMO radio propagation channel condition at the second site based on the LOS-MIMO channel phase condition communicated from the first site. The radio link system hereby acquired information about the LOS-MIMO radio propagation channel condition in both link directions.

The information can, for instance, be used to adjust the number of active MIMO data streams sent over the LOS-MIMO radio link based on the estimated LOS-MIMO radio propagation channel condition, to match the number of transmitted MIMO data streams to the current operating conditions of the LOS-MIMO system in both directions across the radio link. This provides a more stable operation which adjusts to changes in operating conditions.

According to some aspects, the method comprises transmitting the reduced number of MIMO data streams from the first site to the second site as a time-interleaved transmission pattern over the transmit antennas at the first site. This time-interleaved transmission pattern facilitates the determination of the LOS-MIMO channel phase condition, since data associated with transmission from two or more transmit antennas can be obtained in this manner.

The method may also comprise periodically transmitting time-overlapping pilot signals from at least two transmit antennas at the first site. A pilot signal is a special form of signal which is easier to detect than a "normal" communication signal. The pilot signal may, for instance, be a-priori known at the receiver and/or have a different type of modulation which is easier to detect without error, such as a reduced order QAM-order or the like. Transmission of pilot signals in this manner facilitates the determination of the LOS-MIMO channel phase condition, since the channel phases can be determined in a straight forward manner based on the pilot signals. A similar effect is obtained if a MIMO data stream is transmitted from one transmit antenna at the first site while a pilot signal is transmitted from another transmit antenna at the first site. This additional pilot signal is more easily detected compared to other MIMO signals and therefore the MIMO interference due to the pilot signal transmission is possible to manage with little or no impact to detection of the MIMO data streams.

The method optionally also comprises determining the LOS-MIMO channel phase condition by correlating a LOS-MIMO radio signal received at one antenna to a corresponding LOS-MIMO radio signal received at another antenna of the second site. This comparison operation yields the relative phases of the two received signals, and potentially also the relative amplitudes of the two signals. This phase and/or amplitude information is indicative of the LOS-MIMO channel phase condition. The correlation operation can be performed between two or more receiver antennas.

The method may also comprise determining the LOS-MIMO channel phase condition by correlating a detected LOS-MIMO data stream to a LOS-MIMO radio signal received at one antenna and to a corresponding LOS-MIMO radio signal received at another antenna of the second site. This detected LOS-MIMO data stream functions as a reference against which any number of received radio signals can be compared. The comparison will yield both relative phase information and relative amplitude information that can be used to determine the LOS-MIMO channel phase condition.

According to further aspects, the method comprises communicating the determined LOS-MIMO channel phase condition from the second site to the first site periodically. This allows the site at one end of the radio link to obtain information about the LOS-MIMO operating conditions at the other end. Decisions about, e.g., the number of LOS-MIMO data streams to transmit can then be based on the LOS-MIMO operating conditions at the other end. Filtering is optionally applied to the LOS-MIMO channel phase condition data prior to communicating the LOS-MIMO channel phase condition from the second site to the first site, in order to reduce noise and distortion in the data.

The method may also comprise requesting a LOS-MIMO channel condition report from the second site by triggering transmission of a request message from the first site. This way the information at one end of the link can be updated on demand in order to make sure that any decisions are made based on recently updated data.

This objective is also obtained by a computer-implemented method performed in a network node for operating a LOS-MIMO radio link in the presence of interference. The LOS-MIMO radio link is configured to communicate a plurality of MIMO data streams between a first site and a second site of the radio link. The method comprises monitoring a current performance metric of the LOS-MIMO microwave radio link, monitoring a current operating condition of the LOS-MIMO microwave radio link, determining an expected performance metric of the LOS-MIMO microwave radio link, based on the current operating condition of the LOS-MIMO microwave radio link, and if the current and expected performance metrics differ by more than a pre-determined acceptance criterion, adjusting the number of active MIMO data streams communicated over the LOS-MIMO radio link. This way the LOS-MIMO radio link can be configured to transport a suitable number of MIMO data streams over the radio link. The number of active MIMO data streams will be adjusted dynamically to the current operating conditions of the radio link, thereby providing a more stable operation even in the presence of interference and detrimental effects in the MIMO radio propagation channel between the first and the second site as discussed above. The method can advantageously be used to adjust the number of active MIMO data streams in forward and reverse direction across the hop independently from each other, such that a first number of MIMO data streams is active in one direction and a second number of MIMO data streams is active in the other direction, where the first number and the second number may be different. The method optionally comprises reducing the number of active MIMO data streams in case the expected performance metric exceeds the current performance metric by an amount, and/or increasing the number of active MIMO data streams in case the current performance metric exceeds a required performance level by an amount. Thus, a suitable number of active MIMO data streams given the LOS-MIMO channel conditions and interference levels can be maintained at all times.

The current performance metric and/or the expected performance metric may for instance comprise any of a mean-squared error (MSE), a bit error rate (BER), and a packet error rate (PER). These are performance metrics that are easily obtained, and which reflect the performance of the radio link in a reliable manner. The current operating condition may for instance comprise a received signal strength (RSS), a MIMO channel phase condition, and a frequency selective fading state. These are metrics which have been found to reflect the current operating condition of a LOS-MIMO radio link in a good way. Other metrics can of course also be used, including ad-hoc and/or operator defined proprietary metrics of performance and operating condition.

The pre-determined acceptance criterion can be just a fixed threshold value, or a range of acceptable current performance metric values centered on the expected performance metric. These threshold values and/or ranges can be configured separately for each given radio link, and they will to some extent control the behavior of the LOS-MIMO radio link in terms of the number of active MIMO data streams transmitted over the link in the two directions. The acceptance criterion can therefore be used to control the reliability of the transmission over the LOS-MIMO radio link as well as the average transmission rate and spectral efficiency, since it is possible to control operating margins by adjusting the acceptance criteria. Some LOS-MIMO systems can therefore be configured to operate more often with a full set of MIMO data streams compared to other LOS-MIMO systems, at higher risk for detection error. Other LOS-MIMO systems can be configured in a more conservative manner, i.e., more often operating with a reduced set of active MIMO data streams to favor robustness in lieu of data rate.

The objective is furthermore obtained by a computer-implemented method performed in a network node for activating or deactivating transmission of a MIMO data stream in a LOS-MIMO system, from a first site to a second site. The method comprises configuring a nominal output power setting of a transmitted MIMO data stream at the first site, obtaining a request for activation of an additional MIMO data stream, configuring a reduced output power setting at the first site below the nominal output power setting, and initially transmitting the additional MIMO data stream at the reduced output power setting from the first site. This way the receiver signal processing functions will be gradually introduced to the new MIMO data stream. The signal processing functions can then adapt to the new MIMO interference conditions without a sudden increase in detection error which may otherwise result from an abrupt onset of MIMO interference. The reduced output power setting can for instance be obtained from a pre-determined look-up table of output power settings. This is an advantage since it allows for configuring the reduced output power setting in dependence of the particulars of the radio link receiver.

Some radio link receivers may be capable of handling larger amounts of interference, and may also be less sensitive to detection errors.

According to some further aspects, the method comprises obtaining a request for deactivation of a first MIMO data stream transmitted from the first site, and gradually reducing an output power of the first MIMO data stream to be deactivated, prior to ceasing transmission of the first MIMO data stream from the first site. Thus, in a manner similar to the aspects discussed herein above, an abrupt cessation of MIMO interference is avoided, instead allowing a controlled adaptation to the new operating conditions involving a reduced number of MIMO data streams.

The method may also comprise transmitting a message to the second site indicative of an imminent activation of the additional MIMO data stream at the first site. The message provides a warning to the receiver informing about the coming onset of additional MIMO interference that must be managed. The receiver may for instance adjust a configuration of one or more signal processing functions at the second site in response to the message indicative of imminent activation of the additional MIMO data stream. These adjustments can, for instance, comprise increasing an adaptation rate or bandwidth of adaptive signal processing functions, allowing them to converge faster to the new operating conditions once the additional MIMO data stream has been activated.

According to some aspects, the method comprises reconfiguring a modulation format order of one or more MIMO data streams transmitted from the first site prior to initially transmitting the additional MIMO data stream at the reduced output power setting from the first site. This reconfiguration preferably involves a reconfiguration to a modulation format which is less sensitive to MIMO interference which can temporarily result from the activation of the additional MIMO data stream, until the receiver signal processing functions have converged to suppress the additional MIMO interference from the additional MIMO data stream. Examples of such modulation formats comprises lower-order QAM formats.

According to some other aspects, the method comprises obtaining data indicative of a current operating condition of the LOS-MIMO receiver at the second site, and reducing the modulation format order by an amount determined in dependence of the current operating condition. This increases the margins of operation, avoiding detection errors in case operating conditions deteriorate.

The method may also comprise increasing the output power of the additional MIMO data stream at the first site from the reduced output power setting to the nominal output power setting at a predetermined rate. By ramping up output power for the additional MIMO data stream in a controlled manner, the different signal processing functions at the receiver end has time to converge. The rate of increase is preferably configured in dependence of the signal processing function settings at the receiver end. The rate of increase can also be made adaptive, and possibly also set in dependence of feedback information received from the far end, such that the far end receiver can control the rate of increase by sending requests to the transmitter to increase and/or decrease the signal power of the additional MIMO data stream during the convergence of the signal processing functions at the receiver.

There are also disclosed herein transceivers, signal processing circuits and computer program products associated with the above-mentioned advantages.

BRIEF DESCRIPTION OF THE DRAWINGS

The present disclosure will now be described in more detail with reference to the appended drawings, where.

DETAILED DESCRIPTION

Figures 1, 2:
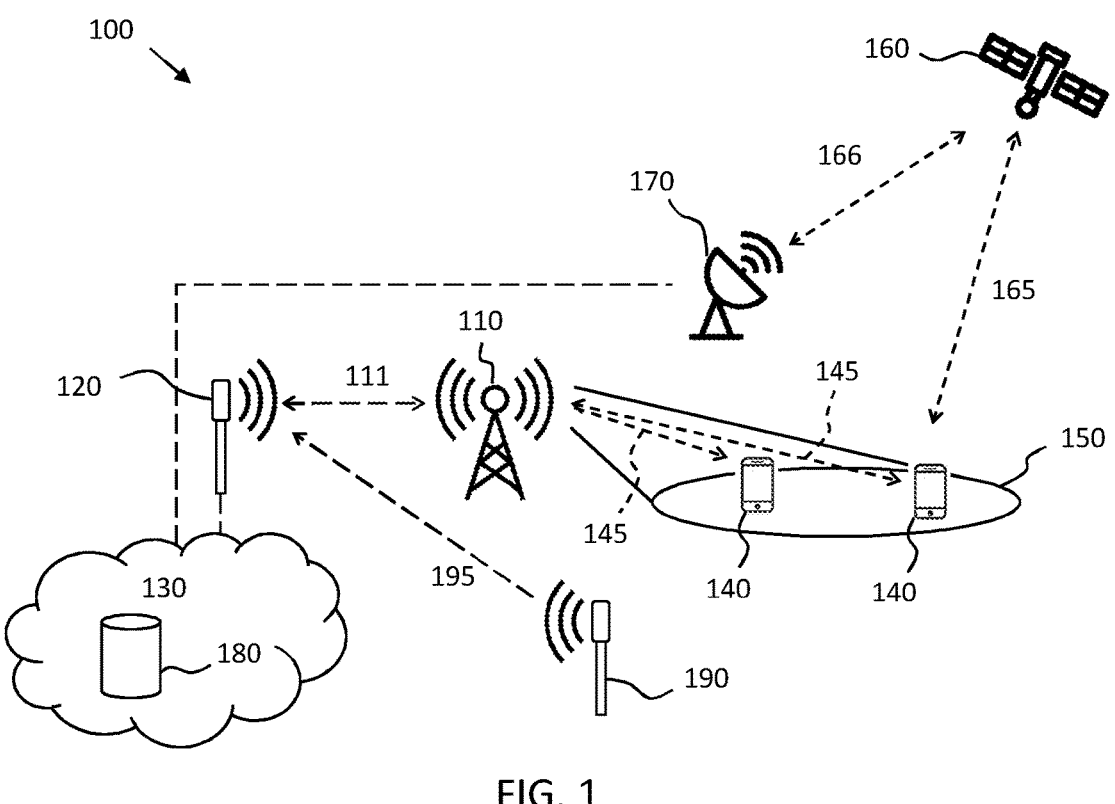
FIG. 1 schematically illustrates a communication network comprising radio links.
FIG. 2 shows an example LOS-MIMO communication system over a LOS channel H.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

FIG. 1 illustrates an example communications network where the herein described techniques, software modules and devices can be used with advantage. A radio base station 110, such as an eNodeB or a gNodeB defined by the 3GPP for 4G and 5G cellular access networks, provides wireless access to a core network 130 over a coverage area 150, i.e., wireless devices 140 located in the coverage area connect to the radio base station 110 over wireless access links 145. The radio base station 110 is connected via microwave radio link 111 to a remote location transceiver 120. This radio link may comprise LOS-MIMO transceivers as discussed in the background section above. The core network 130 may, e.g., form part of an evolved packet core (EPC) network as defined by the 3GPP.

One or more geo-stationary satellite transceivers 160 may also communicate with wireless devices 140 over extra-terrestrial access links 165. The satellite transceiver 160 may be connected to the core network 130 via a ground station 170. The radio link 166 between the satellite transceiver 160 and the ground station 170 may also comprise LOS-MIMO transceivers as discussed above.

A network operations and monitoring system 180 is connected to the core network 130. This network monitoring function keeps track of the network functions and overall network performance and may implement functions for detecting and mitigating error events, as well as for communication performance monitoring. For instance, the network monitoring function may keep track of error rates and other performance measures for the LOS-MIMO radio links in the network neighborhood. The network monitoring function may also control routing of data streams in the network to perform load balancing in dependence of current obtainable data rates on the different backhaul links in the network, and/or warn a network control unit about a potential radio link failure. Part of this load balancing may involve adjusting transport capacity of the various radio links in the system to meet the required throughput demands placed on various parts of the wireless communication system 100.

For instance, the network operations and monitoring system 180 may control the number of active MIMO data streams which are transported over the different LOS-MIMO radio links in the wireless communication system 100. Some LOS-MIMO radio links may be configured to transport additional MIMO data streams to provide increased capacity while some other LOS-MIMO radio links may be configured to operate at reduced capacity, by inactivating one or more MIMO data streams which could potentially otherwise have been transported across the hop. At least some of the techniques disclosed herein are advantageously implemented in this type of network operations and monitoring system 180. However, some or all of the techniques discussed below may also be implemented at a more local level, such as in a control unit for controlling the operation of a single radio link, or even in a control unit configured to control a single radio transceiver. It is an advantage that the different control methods and optimization procedures can be implemented at transceiver level in a distributed manner without central control or with a limited amount of central control.

It is appreciated that LOS-MIMO microwave radio links may be used between almost any two types of wireless devices, even between two mobile wireless devices 140, although they are the most common between fixed location transceivers, such as point-to-point radio links for wireless backhaul applications and in radio links involving geostationary satellites. This is mainly because of the strict requirements on antenna geometry placed on LOS-MIMO systems in order to obtain the above-mentioned increase in spectral efficiency.

The performance of a LOS-MIMO microwave radio link depends on many factors, e.g., as discussed in U.S. Pat. No. 7,948,444 B2 and also in U.S. Pat. No. 9,941,941 B2. Two factors which are particularly important for microwave radio link performance are the interference conditions in the area where the microwave radio link has been deployed, and the relative phases on the radio propagation paths in-between transmitter antennas and receiver antennas, referred to herein as the antenna geometry of the LOS-MIMO system. The relative gains on the radio propagation paths in-between transmitter antennas and receiver antennas also impacts the capacity of a LOS-MIMO system, since an amplitude imbalance over the different radio propagation paths from transmitter antennas to receiver antennas may negatively influence the capacity of carrying a larger number of MIMO data streams over the hop.

The interference conditions are of course governed primarily by the presence of interferers and their respective characteristics, but is also impacted by the antenna design of the LOS-MIMO radio link, e.g., by the antenna diagrams and how the antennas are directed. FIG. 1 shows an interfering radio transmitter 190 which generates interference to the microwave radio link transceiver 120. This interference is normally limited due to the careful frequency planning which is done during deployment of a network of microwave radio links, but it can nevertheless occur due to mistakes in planning, modelling errors during planning, and/or other unforeseen effects from network densification. U.S. Pat. No. 9,893,822 B2 discusses some aspects of radio link planning comprising LOS-MIMO microwave radio links. The relative phases on the radio propagation paths in-between transmitter antennas and receiver antennas are determined by the antenna separation in relation to the carrier frequency and hop length as discussed in U.S. Pat. No. 7,948,444 B2, but also by intermittent atmospheric effects which cause changes in relative phase between the different antenna pairs of the LOS-MIMO radio link. The optimal antenna separation in a LOS-MIMO system can be derived based on hop parameters (mainly hop distance), carrier frequency and the number of MIMO antennas in a known manner. Any deviation from the optimal LOS-MIMO antenna geometry will have an impact on LOS-MIMO system performance. Sub-optimal antenna geometries can be compensated for to some extent by the application of pre-coding techniques, as discussed, e.g., by L. Zhou and Y. Ohashi in "Low complexity millimeter-wave LOS-MIMO precoding systems for uniform circular arrays," 2014 IEEE Wireless Communications and Networking Conference (WCNC), pp. 1293-1297, 2014.

To better understand the effects of phase shifts and amplitude imbalance in the radio propagation channel between transmitter and receiver, FIG. 2 illustrates an example LOS-MIMO radio link 200 comprising a transmitter 201 arranged to transmit a set of information symbols $\{s_1, s_2, \ldots, s_N\}$ to a receiver 202. Each sequence of information symbols input to the system on a given input port is referred to herein as a MIMO data stream. A LOS-MIMO system can maximally carry a number of MIMO data streams equal to the rank of the channel matrix H, which in turn cannot exceed the smallest number of antenna elements at one end of the radio link, i.e., min (N,M) in FIG. 2.

The information symbols $\{s_1, s_2, \ldots, s_N\}$ may be quadrature amplitude modulated (QAM) symbols or some other type of information symbol, such as information symbols in an orthogonal frequency division multiplexed (OFDM) system. The transmitter here comprises N separate transmit side oscillators 240 for converting the signal to be transmitted from baseband up to the transmission frequency band. For a microwave radio link, this transmission frequency band is normally at or above 6 GHz. Some common examples are 6 GHz, 11 GHz and 15 GHZ, although higher frequencies are more common, at least for more short distance communication. Modern microwave radio link systems operate as high up as the E-band which is located at about 80 GHz. Even higher carrier frequencies are also possible, such as 120 GHz and even bands up to about 300 GHz have been considered. It is normally difficult to distribute such high frequency signal between spatially separated antennas 220, 230, which is why independent oscillators, or oscillators sharing a lower frequency reference signal (which is easier to distribute due to the lower frequency) is used. The phasor representing the n-th transmit side oscillator phase is denoted $$e^{j\phi_n^t},$$

where it is understood that the phase $$\phi_n^t$$

is a function of time although this dependency has been left out for increased readability.

The transmitted signal passes between the N transmit antennas 220 to the M receive antennas 230 over a LOS channel modelled by a complex channel matrix H 210. The channel, generally, applies a relatively slowly time-varying complex gain in-between any two antennas. This complex gain represents a change in amplitude as well as a change in phase. H is the complex-valued channel propagation matrix, which e.g. can be written as $$H = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix}$$

for 4×4 spatial (single-polarized) MIMO channel, or $$H = \begin{bmatrix} h_{11}^{VV} & h_{12}^{VV} & h_{11}^{VH} & h_{12}^{VH} \\ h_{21}^{VV} & h_{22}^{VV} & h_{21}^{VH} & h_{22}^{VH} \\ h_{11}^{HV} & h_{12}^{HV} & h_{11}^{HH} & h_{12}^{HH} \\ h_{21}^{HV} & h_{22}^{HV} & h_{21}^{HH} & h_{22}^{HH} \end{bmatrix}$$

for 4×4 spatial dual-polarized MIMO channel with vertical (V) and horizontal (H) polarization.

The received signal is down-converted in frequency to baseband using M receive side oscillators 250. The phasor representing the m-th receive side oscillator phase is denoted $$e^{j\phi_m^r},$$

where it is again understood that the phase $$\phi_m^r$$

is a function of time.

Additive noise $\{n_1, n_2, \ldots, n_M\}$ 260 is also added at the receiver. Consequently, the received signal at one of the receive side antenna branches is given by $$r_m = \sum_{n=1}^{N} h_{mn}^{\phi} s_n + n_m$$

where $n_m$ may at least resemble additive white Gaussian noise (AWGN). Given a vector r of received signal samples $$r = Hs + n$$

where $s=[s_1, s_2, \ldots, s_N]$ and $n=[n_1, n_2, \ldots, n_M]$, disregarding effects of transmitter non-linearity and phase noise which has been extensively discussed in the literature, the transmitted information symbols can be recovered as $$\hat{s} = H^{-1} r$$

Thus, it is appreciated that problems arise if the channel matrix H is ill-conditioned or even rank deficient, in which case the matrix inversion becomes unstable or even impossible to determine, resulting in loss of information.

A MIMO radio link is able to carry a plurality of data streams over the hop. It is common to denote one such stream of symbols as a MIMO data stream. Generally, the maximum number of data streams a LOS-MIMO radio link can support equals the rank of the channel matrix H, i.e., the smallest out of the number of transmit antennas and the number of receive antennas. Without loss of generality, we will assume herein that a LOS-MIMO radio link is capable of supporting a nominal number of MIMO data streams, which is an integral number equal to the smallest number of transmit antennas and receive antennas, where a dual polarized antenna then counts as two antennas. The supported nominal number of streams can then be reduced by interference and/or by detrimental changes in radio propagation channel phase and/or amplitude imbalance between the propagation paths to a number smaller than the nominal number.

In an operational LOS-MIMO system, radio signals will be affected by various ground and atmospheric conditions that will affect the relative phases of transmitted signals when received at the different receive antennas. Generally speaking, LOS-MIMO antenna geometry provides a static contribution to the MIMO phase relations, while atmospheric variation introduces dynamic changes between the phases of signal components seen at the different receive antennas. Even through optimal antenna separation is ensured during the normal propagation condition, the MIMO channel might be degraded by rain, multipath fading, etc.

Examples of real-world measurements of the phase relationships over a LOS-MIMO microwave radio link hop demonstrate that a reduced phase difference between MIMO paths can degrade the system performance significantly and in worst case result in outage and link failure. It is well-understood in the art that when phase difference between the MIMO paths becomes small, the combined signal power after interference cancellation is significantly reduced. In addition, this operation region (with small-valued phase difference) is challenging for an equalizer since it is required to adapt fast with big steps (high bandwidth adaptation), without losing stability.

Generally herein, the term MIMO channel phase condition, or just MIMO phase, will be used to refer to the relative phases in the MIMO radio propagation channel matrix H. A good MIMO channel phase means that the phase differences on the different MIMO paths from transmitter antennas to receiver antennas are suitable for MIMO communication, while a bad phase condition means the opposite. It is appreciated that the MIMO phase is tightly linked to the condition number of the channel matrix H, and also to the spread in the eigenvalues of the channel matrix H.

In traditional MIMO systems, precoding can be used to improve the system performance when channel phase condition is poor, e.g., when phase difference between the MIMO paths is small. However, due to the large antenna separation, it is often impossible in a LOS-MIMO system to synchronize the multiple transmit/receiver local oscillators which is required in precoding, as mentioned above in connection to the discussion around FIG. 2.

Methods are proposed herein which increase the tolerance to external interference as well as to changes in the radio propagation channel between LOS-MIMO transmitter and receiver. The methods permit fast adaptation to variations in both interference conditions and radio propagation channel. This is achieved by gradually switching off transmitted MIMO data streams until acceptable performance is obtained. When the operating conditions once more permit additional MIMO data streams to be transported over the hop, and the current traffic load merits an increase in the number of active MIMO data streams, the inactivated MIMO data streams are turned back on again in order to allow an increase in spectral efficiency.

The decision to turn on and off MIMO data streams is performed in a control unit, such as the network operations and monitoring system 180, or in a local control unit comprised in the microwave radio link transceiver. The decision can be based on LOS-MIMO channel phases and amplitudes, i.e., based on the eigenvalues of the channel matrix H, and/or on various other inputs, such as: mean-squared error (MSE) measured in a receiver, bit-error rate (BER), packet-error rate (PER), and/or received power levels. The proposed solution provides a method to manage interference coming from known or unknown external sources, which may be temporal. The techniques discussed herein make the system more robust to interference and also allows for maintaining communication during high interference operating conditions. A benefit of the proposed technique is a reduction in link outage, i.e., the microwave radio link goes down more seldom, which of course is a good thing if the microwave radio link is used for backhauling and other critical communication tasks in the wireless communication system 100.

Figure 3:
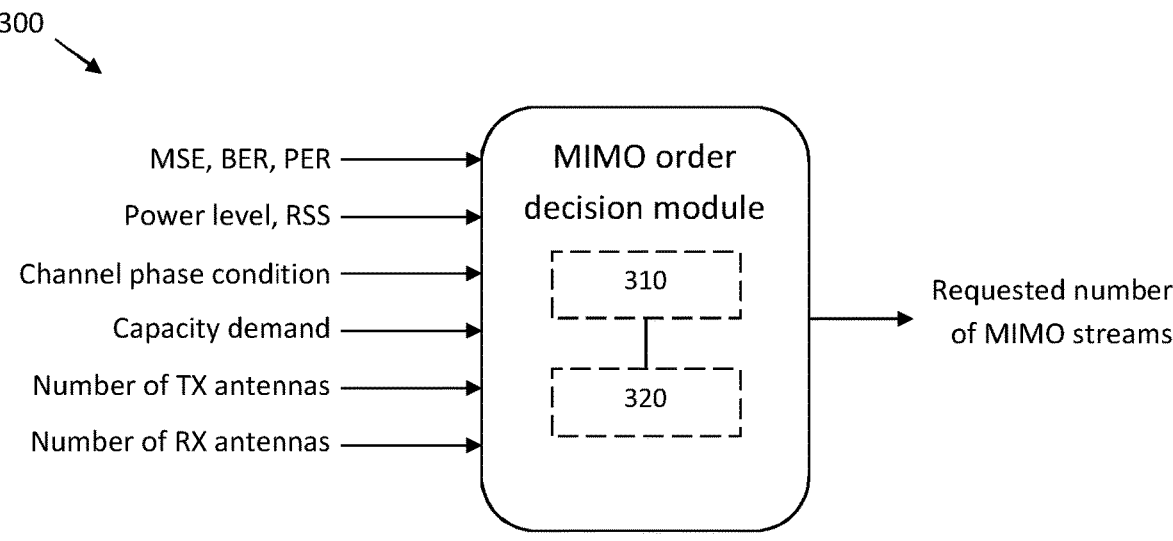
FIG. 3 shows a mechanism for requesting an active number of MIMO data streams.

FIG. 3 illustrates a MIMO order decision module 300 which monitors the current operating conditions of a LOS-MIMO radio link and requests a number of MIMO data streams which it estimates that the LOS-MIMO radio link can currently support given the operating conditions. The MIMO order decision module 300 may monitor performance degradation due to changes in channel phase, e.g., from atmospheric effects and/or from external interference to one or more receivers. More generally, the radio channel matrix H is monitored. The MIMO order decision module 300 comprises a detector 310 and an order determination device 320. The detector 310 is configured to detect events such as onset of interference and/or onset of channel phase variation due to atmospheric effects or other phenomena that affects the propagation of electromagnetic energy from a first site of the radio link (near end) to a second site of the radio link (far end). The order determination device 320 determines a suitable number of MIMO data streams which can be carried across the radio link in a given direction. It is appreciated that the number of MIMO data streams supported in one direction may not necessarily equal the number of MIMO data streams supported in the other direction, since both MIMO channel phase and interference conditions can differ in the two directions of the radio link. Also, the transceiver hardware at the two ends of a LOS-MIMO radio link may not be equal in terms of performance, adding to the potential asymmetry of operating conditions across the radio link.

The detector 310 and the order determination device 320 use a combination of measurements such as measurements of received signal power, MSE, BER and PER. Some example inputs to the module are shown in FIG. 3, but this is just an example and not to be construed as limiting to the disclosure. MSE, BER and PER can be used to detect that something is amiss with the communication across the hop, especially of combined with measurements of power levels and/or RSS, as will be elaborated on below. The detector 310 monitors a current performance metric of the LOS-MIMO microwave radio link and compared this current performance metric to an expected performance metric which is determined based on the operating conditions of the radio link, i.e., the received power levels and so on. If the current and expected performance metrics differ by more than some pre-determined acceptance criterion, the order determination device 320 will adjust the number of active MIMO data streams communicated over the LOS-MIMO radio link. For example, suppose that the MIMO order decision module 300 expects a given MSE of, say X dB, but observes a significantly higher MSE of Y dB>X dB, at the same time as the RSS is within an acceptable range. The MIMO order decision module 300 may then decide to try to reduce the number of active MIMO data streams to see if that helps bring down the MSE.

The channel phase condition relates to the relative phases of the radio propagation paths from the transmitter antennas to the receiver antennas. It is appreciated that path gains are also important for radio system performance. Generally, a channel phase condition is to be interpreted as a measure of the differences in eigenvector magnitudes of the channel, i.e., its condition number. U.S. Pat. No. 7,948,444 B2 discusses the impact on communication performance from a sub-optimal antenna geometry. It is relatively straight forward to estimate the channel phase condition as long as all MIMO data streams are active, i.e., as long as full rank MIMO communication is taking place, see, e.g., U.S. Pat. No. 9,941,941 B2. However, when the system is operated at reduced capacity, where one or more MIMO data streams have been turned off, then channel phase estimation is no longer straight forward. To provide a solution, new methods for LOS-MIMO channel estimation applicable also when one or more MIMO data streams have been turned off will be discussed below, e.g., in connection to FIG. 6.

The capacity demand of the network can also provide valuable input information to the MIMO order decision module 300. In case no large demands on capacity are placed on the link then the number of active MIMO data streams can be kept below the maximum number of MIMO data streams, as determined by the smallest out of the number of TX antennas and the number of RX antennas. It is appreciated that a LOS-MIMO radio link that is operating at reduced capacity with respect to the number of active MIMO data streams is often more resilient to detrimental effects such as a worsening of the MIMO channel phase conditions. By operating the LOS-MIMO link at a number of active MIMO data streams below the maximum obtainable MIMO data streams, an additional measure of robustness can be obtained, which may be an advantage in some case, for instance when the microwave radio link is used to carry sensitive data.

If an interfering signal is detected, or a critical channel phase condition is foreseen, the MIMO system will reduce its MIMO order (reduce the number of active MIMO data streams) in order to free up spatial degrees of freedom. Normally, as discussed above, the spatial degrees of freedom is the same as the smallest number of antennas at the two ends of the microwave radio link, and a microwave radio link can carry as many data streams as there are spatial degrees of freedom. Thus, if the system is 2×2 (two transmit antennas and two receive antennas), then there are two degrees of freedom, while a 3×4 system has three degrees of freedom, and a 4×4 system has four degrees of freedom. The freed up spatial degrees of freedom can then be used to suppress interference and/or to compensate for defects in the LOS-MIMO radio propagation channel from transmitter antennas to receiver antennas. One way to look at the interference mitigation function is that the receiver instead of cancelling interstream interference with its antennas starts to cancel external interference from other sources. The external interference may be temporary and if/when it disappears, the MIMO system can switch back to normal operation which means inter-stream interference cancellation. Mechanisms for re-activating MIMO data streams, i.e., turning additional MIMO data streams on again after a performance degrading event, will be discussed in more detail below, for instance in connection to FIG. 6.

Figure 4:
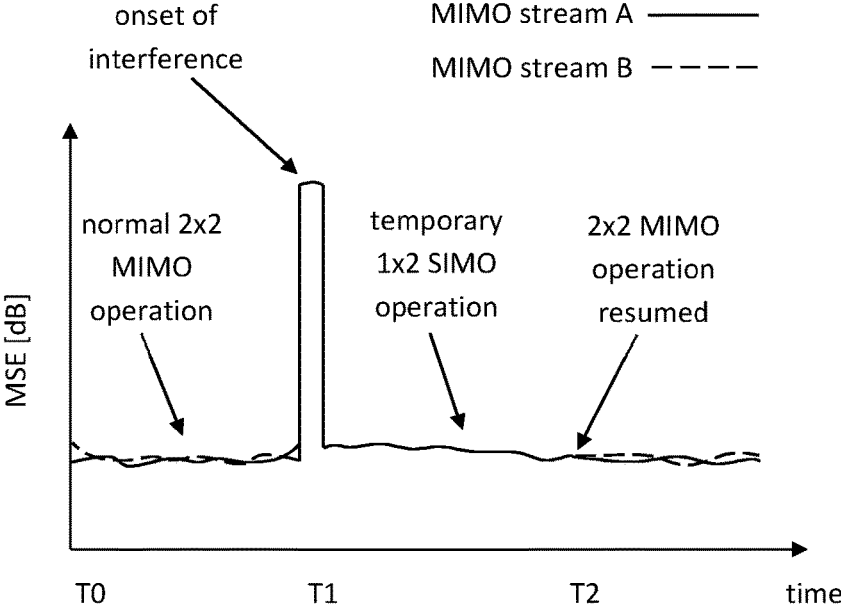
FIG. 4 is a graph illustrating MSE vs time in a LOS-MIMO system.

FIG. 4 shows an example of the operation of the MIMO order decision module 300. At time TO two MIMO data streams, stream A and stream B, are transmitted over the LOS-MIMO link. The MSEs on both streams are acceptably low and operation is satisfactory for both streams. Then, at time T1, interference appears which causes the MSE to rise sharply. The MIMO order decision module 300 detects the onset of interference and quickly requests a decrease in the number of active MIMO data streams, resulting in deactivation of MIMO data stream B. The interference then goes away, which is also detected by the MIMO order decision module 300. A time T2 the request for re-activation of MIMO data stream B is triggered, resulting in resumption of MIMO operation over the hop.

According to one example, detection of the presence of interference is based on received signal strength (RSS) and MSE measurements (or some other suitable detection error metric, such as error vector magnitude, EVM). If the detection error metric is increased at the same time as RSS is increased or at least not significantly reduced, then it is likely caused by an interferer that has appeared. Some types of microwave radio links, such as long haul microwave radio links, may experience both upfading (when RSS increases) and downfading (when RSS decreases). During upfading (increased power, which can be more than 10 dB) non-linearity issues can be experienced. These non-linearity issues are a form of self-interference which is not due to other transceivers.

According to another example, the detection of the disappearance of an interferer is based on RSS and detection error measurements. For instance, if the MSE is reduced at the same time as RSS is reduced or is approximately constant, then it is likely caused by an interferer that has disappeared.

Detection of the presence of interference can as mentioned above also be based on channel phase condition in combination with MSE measurements. If the MSE is increased at the same time as the channel phase condition is the same, then it is likely caused by an interferer that has appeared. Detection of the disappearance of an interferer can also be based on channel phase condition and MSE measurements. If the MSE is reduced at the same time as channel condition remains the same, then it is likely caused by an interferer that has disappeared.

Figure 5:
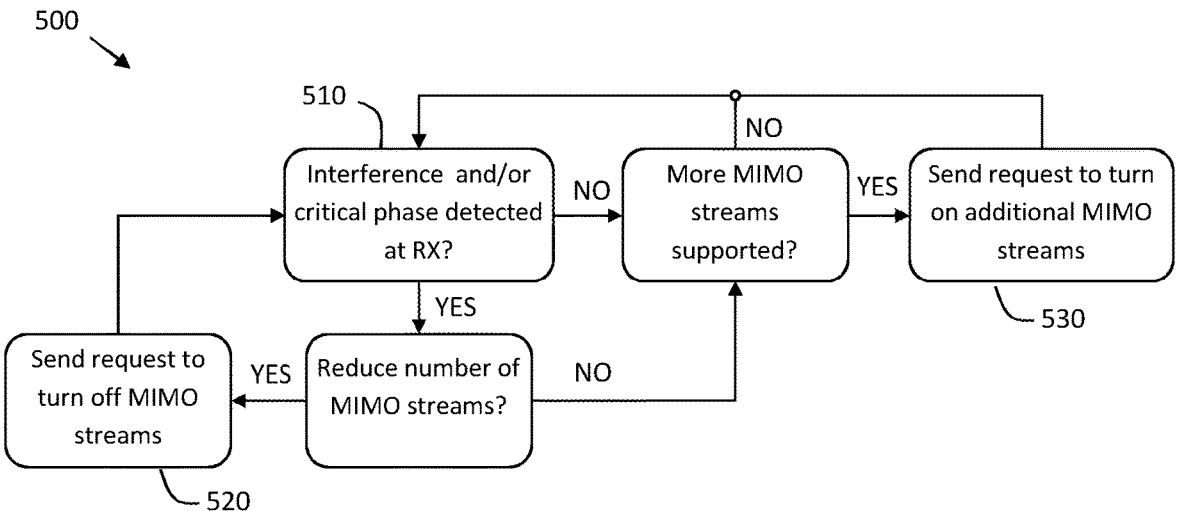
FIG. 5 is a flow chart illustrating a decision process for configuring MIMO data streams.

FIG. 5 schematically illustrates a process diagram for the operation of the MIMO order decision module 300 discussed above in connection to FIG. 3, for the specific case of reacting to an onset of interference. The process starts at state 510, where the interference conditions of the LOS- MIMO microwave radio link are monitored. In case interference is detected at the receiver, and it is deemed suitable by the MIMO order decision module 300 to reduce the number of active MIMO data streams, then a request 520 to turn off a MIMO data stream is triggered. If instead the MIMO order decision module determines that an increase in the number of active MIMO data streams can be supported, then a request 530 is triggered for activating additional MIMO data streams.

The current traffic load on the link is preferably considered when determining how many MIMO data streams to transmit over the hop. There is no point in increasing the number of data streams if the current traffic load does not require it. On the other hand, increasing the number of data streams over the hop may mean that the spectral efficiency per stream can be reduced, e.g., by reducing an order of modulation on the stream. It may be desired to maintain a certain amount of over-capacity on a given microwave radio link, in order to account for faster changes in traffic load.

Figures 13, 14, 15:
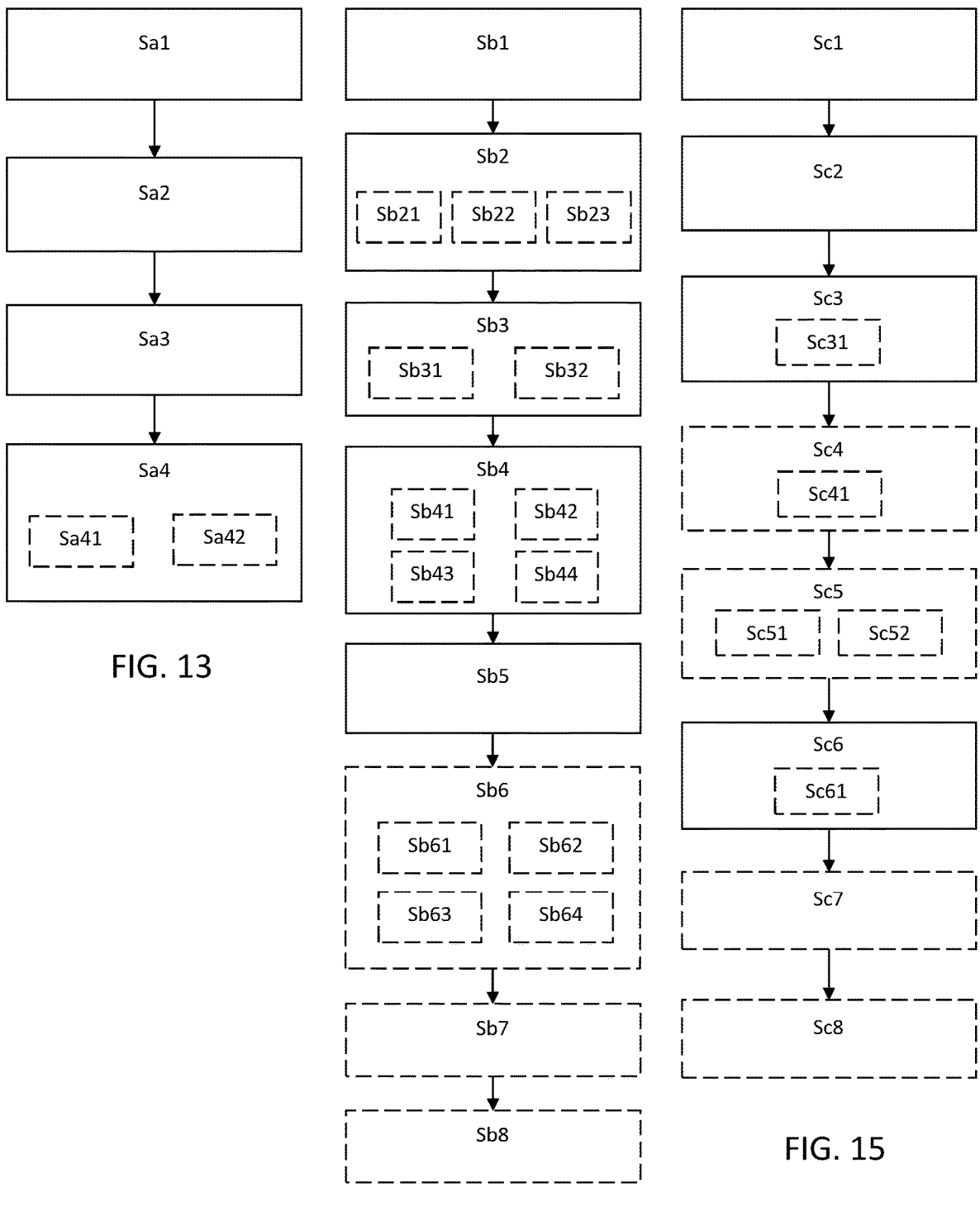
FIGS. 13-15 are flow charts illustrating methods for use in LOS-MIMO systems.

FIGS. 13-15 are flow charts that illustrate methods which summarize the discussion herein. FIG. 13 illustrates a computer-implemented method, performed in a network node 110, 120, 160, 170, 180, 300, i.e., at a LOS-MIMO site, in a satellite, at a network operations and monitoring node or in some other control unit. for operating a LOS-MIMO radio link 111, 166 in the presence of interference. The LOS-MIMO radio link 111, 166 is configured to communicate a plurality of MIMO data streams between a first site and a second site of the radio link as discussed above, e.g., in connection to FIG. 2. The method comprises monitoring Sa1 a current performance metric of the LOS-MIMO microwave radio link, e.g., by observing a quality of the data detection process performed at the receiving ends of the link and/or the signal quality of the received MIMO radio signals, for instance in terms of MSE or EVM, or some other performance metric indicative of how well the information symbols carried by the MIMO data streams are being detected. The method also comprises monitoring Sa2 a current operating condition of the LOS-MIMO microwave radio link. The current operating condition may, for instance, comprise one or more properties of the LOS-MIMO radio propagation channel as discussed above, such as the relative phases and/or the relative gains of the propagation paths in-between the different antennas in the LOS-MIMO system. The current operating condition can also comprise properties of the LOS-MIMO radio channel propagation matrix H 210 in terms of its eigenvalues and/or its condition number. According to some aspects, the current operating condition comprises any of; an RSS, a MIMO channel phase condition, and a frequency selective fading state.

The method also comprises determining Sa3 an expected performance metric of the LOS-MIMO microwave radio link, based on the current operating condition of the LOS-MIMO microwave radio link. With reference to the discussion above in connection to, e.g., FIG. 3, the current performance metric and/or the expected performance metric may comprise any of; an MSE, a BER, and a PER. Other types of performance metrics can of course also be envisioned, including ad-hoc performance metrics defined in dependence of the system they are meant to monitor. Generally, an expected performance metric is indicative of how the microwave radio link is expected to behave given the current operating conditions of the LOS-MIMO microwave radio link.

The expected performance metric can be determined at least in part based on the system properties of a given LOS-MIMO system, such as its output power, link distance, and antenna geometry. For instance, the expected performance can be obtained from a pre-determined computer model of the LOS-MIMO radio link, which model is parameterized by the system properties. Thus, by inputting the system properties for a given LOS-MIMO radio link into the model, the expected performance of the radio link is obtained.

According to another example the expected performance is obtained from past measured performances of the actual radio link, and/or from data obtained from a mathematical model of expected performance of the microwave radio link. This mathematical model can, for instance, be determined based on output power, path loss over the radio link, and LOS-MIMO antenna geometry. Such models of expected LOS-MIMO performance are generally known and will therefore not be discussed in more detail herein.

By the features of monitoring the current performance of the radio link and determining the expected performance of the radio link, the system is continuously or at least periodically aware of how well the LOS-MIMO radio link is doing in relation to how it should be doing given the current operating conditions. This allows the system to detect when something is not right, in which case one or more actions can be taken to remedy the situation. If the current and expected performance metrics differ by more than a pre-determined acceptance criterion, the number of active MIMO data streams communicated over the LOS-MIMO radio link can be adjusted Sa4, and most likely decreased. The pre-determined acceptance criterion can either be a fixed threshold value, or a range of acceptable current performance metric values centered on the expected performance metric. This means that the system can compare the current performance of the radio link to the expected performance and trigger an action in case the discrepancy between the two is not in agreement with the acceptable discrepancy configured for the microwave radio link in question. It is an advantage that different acceptance criteria can be configured for different LOS-MIMO radio links. For instance, some links are arranged to carry sensitive information (and have more strict requirements on performance) while other links may operate on a best effort basis (with less strict requirements on performance).

According to some aspects, the method comprises reducing Sa41 the number of active MIMO data streams in case the expected performance metric exceeds the current performance metric by an amount. In other words, if the microwave radio link is not performing as well as it is supposed to, the number of active MIMO data streams can be reduced in order to free up spatial degrees of freedom which can be used to improve performance for the remaining MIMO data streams, e.g., by allowing interference cancellation or by a better matching of the number of active MIMO data streams to the current rank of the LOS-MIMO radio propagation channel. For example, suppose that the LOS-MIMO system is a 4×4 LOS-MIMO system with four transmit antennas and four receive antennas, and that the channel matrix only has three eigenvalues of reasonable magnitude. Then it will be beneficial to reduce the number of active MIMO data streams to three, since this better matches the capability of the LOS-MIMO radio propagation channel to carry MIMO data streams over the microwave radio link hop. In a similar manner, the method may comprise increasing Sa42 the number of active MIMO data streams in case the current performance metric exceeds a required performance level by an amount. In this regard it is also appreciated that the traffic load may be taken into account, i.e., an increase of the number of active MIMO data streams can be postponed in case the current traffic load on a particular LOS-MIMO radio link is not high enough to merit activating additional MIMO data streams.

With reference also to FIG. 14, which illustrates a method that will be discussed in more detail below, the method optionally comprises configuring Sb1 the LOS-MIMO radio link 111, 166 to communicate a reduced number of MIMO data streams smaller than the nominal number of MIMO data streams over the radio link, transmitting Sb2 the reduced number of MIMO data streams from the first site to the second site, determining Sb3 a LOS-MIMO channel phase condition at the second site, based on the reduced number of MIMO data streams transmitted from the first site, communicating Sb4 the determined LOS-MIMO channel phase condition from the second site to the first site, and estimating Sb5 a LOS-MIMO radio propagation channel condition at the first site based on the LOS-MIMO channel phase condition communicated from the second site. Thus, it is appreciated that the method illustrated by the flow chart in FIG. 13 can also comprise operations illustrated in FIG. 14.

With additional reference to FIG. 15, which will also be discussed in more detail below, the method may also comprise configuring Sc1 a nominal output power setting of a transmitted MIMO data stream at the first site, obtaining Sc2 a request for activation of an additional MIMO data stream, configuring Sc3 a reduced output power setting at the first site below the nominal output power setting, and initially transmitting Sc6 the additional MIMO data stream at the reduced output power setting from the first site. This power adjustment during an onset of transmission was discussed in connection to FIG. 12 above, and will be discussed in more detail below in connection to the flow chart in FIG. 15. Thus, it is appreciated that some or all of the aspects discussed below in connection to FIGS. 14 and 15 can be freely combined with the method illustrated in FIG. 13, and vice versa. For instance, the method may comprise obtaining Sc31 the reduced output power setting from a pre-determined look-up table of output power settings, and/or transmitting Sc4 a message to the second site indicative of an imminent activation of the additional MIMO data stream at the first site. The method may furthermore comprise adjusting Sc41 a configuration of a LOS-MIMO receiver at the second site in response to the message indicative of imminent activation of the additional MIMO data stream, as well as reconfiguring Sc5 a modulation format order of one or more MIMO data streams transmitted from the first site prior to initially transmitting the additional MIMO data stream at the reduced output power setting from the first site.

Figure 6:
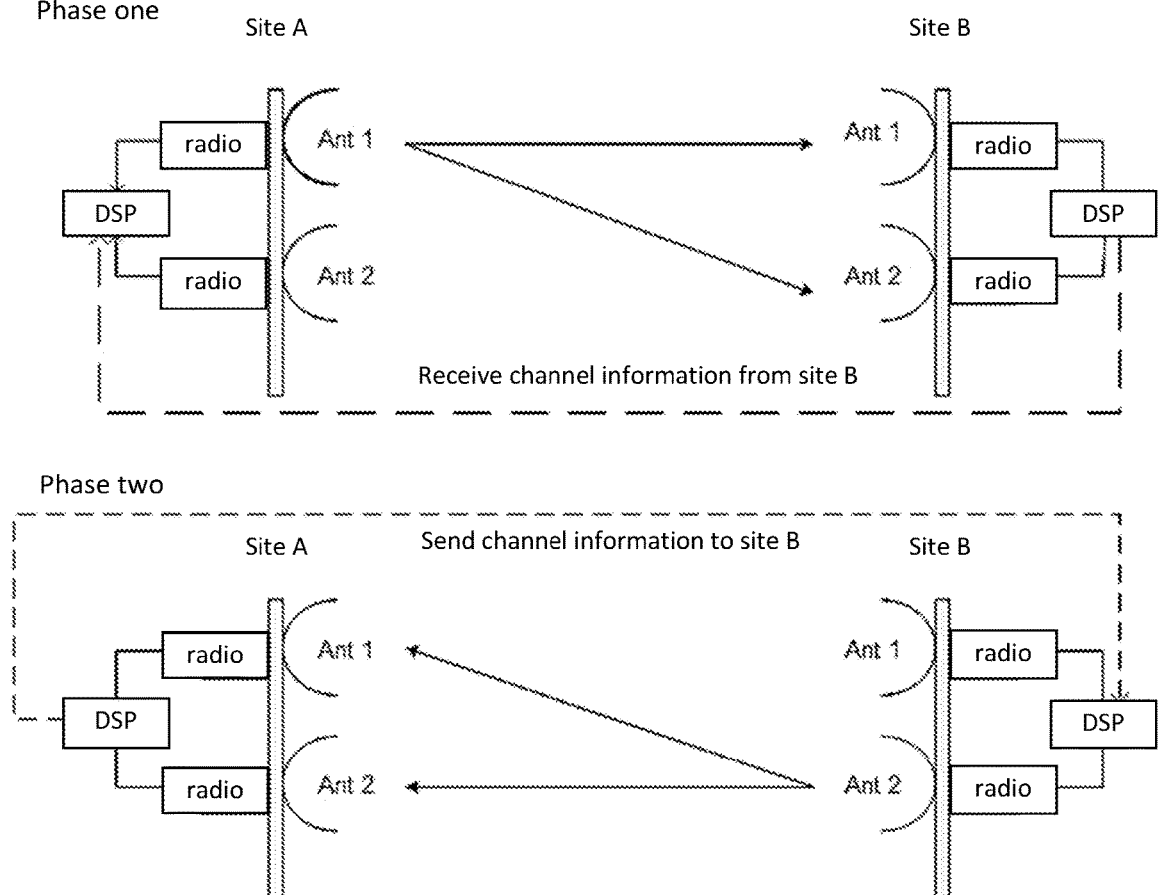
FIG. 6 schematically illustrates a process for LOS-MIMO channel estimation.

Precoding techniques can be used to mitigate the negative effects of channel phase variation. However, for a LOS-MIMO system, due to the large antenna separation, it is often difficult to synchronize the multiple transmit/receiver local oscillators which is required to exploit precoding. In absence of channel precoding, it is therefore preferred to reduce the number of MIMO data streams when channel variation occur. In a two-by-two MIMO system, this results in a single-input multiple-output (SIMO) mode. When operating in MIMO mode, there are different methods to monitor the MIMO channel condition, including phase variation, see e.g., U.S. Pat. No. 9,941,941 B2, which can be implemented in the MIMO order decision module 300 for adjusting the number of active MIMO data streams to the current operating condition. However, in order to determine when to switch back to MIMO mode from, e.g., a SIMO mode of operation, there is also a need for methods to determine the MIMO channel condition when the system is operating with one transmitter only, as illustrated in FIG. 6. A technique for channel estimation under such conditions will now be described, which can be implemented in the MIMO order decision module 300 and used to trigger increase in the number of active MIMO data streams when the channel matrix H is deemed to be able to support the increased number of MIMO data streams. The proposed solution is a channel estimation method of low complexity which relies on channel measurements based on one transmit antenna from one or two sites of the microwave hop. By combining the measurement from both sites, a complete overview of the MIMO channel can be obtained, which can be used to determine when to switch from SIMO operation mode to MIMO operation mode, or, more generally, when to increase the number of active MIMO data streams from a reduced number of active MIMO data streams.

The proposed channel estimation method is suitable for a LOS-MIMO system with unsynchronized local oscillators and operating without precoding. It allows to estimate the MIMO channel condition with one transmit antenna at each site. When the channel condition is deemed satisfactory for resumed MIMO operation, it allows for reliable switching back to MIMO operation mode.

The proposed solution is a computer-implemented method for estimating a LOS-MIMO radio propagation channel condition, wherein the LOS-MIMO radio link is arranged to communicate a nominal number of MIMO data streams over the radio link from a first site to a second site, but is currently only communicated reduced number of MIMO data streams over the hop. The method involves combining channel measurement results from both sides of the radio link to obtain an overview of the MIMO channel condition.

FIG. 6 illustrates the principal idea of the proposed channel estimation method. The example if provided for a 2×2 LOS-MIMO system, but it can easily be generalized to an N×M LOS-MIMO system. In a first phase, indicated in FIG. 6 as phase one, a MIMO data stream is transmitted from site A to site B, using a single TX antenna (Ant 1). The transmitted MIMO data stream is received at site B, where the relative phase relationship of the two signals received at the first and the second antenna is determined. This relative phase condition forms part of the channel condition from site A to site B. Of course, received powers, frequency selective fading states, and so on can also form part of the channel condition. Information associated with the determined channel condition is then transmitted back to site A from site B. Thus, site A receives information indicative of the LOS-MIMO channel conditions at site B. If the LOS-MIMO channel condition if found sufficiently good for activating additional MIMO data streams, and the capacity increase is motivated by the current traffic load on the microwave radio link, the system may proceed with increasing the spectral efficiency of communication over the LOS-MIMO radio link by activating one or more additional MIMO data streams.

A similar procedure may optionally be performed at site B, in a second phase. This procedure results in that the channel conditions seen at site A when receiving a MIMO data stream from site B is fed back to site B. By combining the measurements of channel condition made at the two ends of the LOS-MIMO radio link, an overview of the LOS-MIMO channel conditions can be obtained.

According to one example, the feedback from the receiver side to the transmit side can be the measured channel parameters. The feedback can be time averaged channel parameters, perhaps also with an indication of the trend in the channel parameters. This trend information permits a network node to predict a future channel condition, and thus take action before the channel condition has reached a critical state which jeopardizes LOS-MIMO operation.

According to another example, the feedback from the receiver side to the transmit side can be a single bit ACK/NACK signaling, i.e., a binary decision variable resulting from a comparison with some acceptance criterion, to indicate the channel condition measured at the receiver side is sufficiently good and fulfils the condition to switch to the MIMO mode.

There can also be a dedicated control unit which has the functionality to determine the switching between SIMO and MIMO mode, i.e., the activation or deactivation of MIMO data streams over time. Each site of the microwave hop can be equipped with a switching determination function, and the switching determination functions at the two sites can be made independent from each other. According to another example, one switching determination function controls the switching between SIMO and MIMO modes for both sites of the microwave hop. The control function can also be realized in a remote network node, such as the node 180 discussed above in connection to FIG. 1. The channel condition can also be evaluated by comparing the measured SIMO equalizer values with pre-stored SIMO equalizer reference values at good channel condition. This provides an idea of the frequency selectivity of the radio propagation channel between the two sites. The channel condition can of course also include power measurement, phase measurement, MSE, etc.

According to some aspects, if the phase measurement at one site already indicates a sufficiently good phase condition for the combined MIMO channel, the determination of the switching can be based on channel measurement from one site. One example is given in FIG. 7 where Ta and Tb represent the thresholds for measurement at Site A and Site B, respectively. The channel condition or rank is given by the sum of the phase different from the two sides. When the sum exceeds a certain threshold (Ta2+Tb2>=threshold), it indicates the channel has a good condition. If one of the phase difference Ta1 or Tb1 alone exceeds the threshold Ta1>=threshold or Tb1>=threshold, it is a sufficient condition to show Ta1+Tab1>=threshold. If the threshold Ta1 or Tb1 is exceeded, the measurement from one site is sufficient to determine the switching. If the threshold Ta2 or Tb2 is not reached, then it requires both Ta2 and Tb2 are exceeded at Site A and Site B.

According to a first example, the feedback from the receiver side to the transmit side can be periodic. In another embodiment, the feedback can be event-triggered, e.g., triggered by a request from the transmit side.

Figure 8:
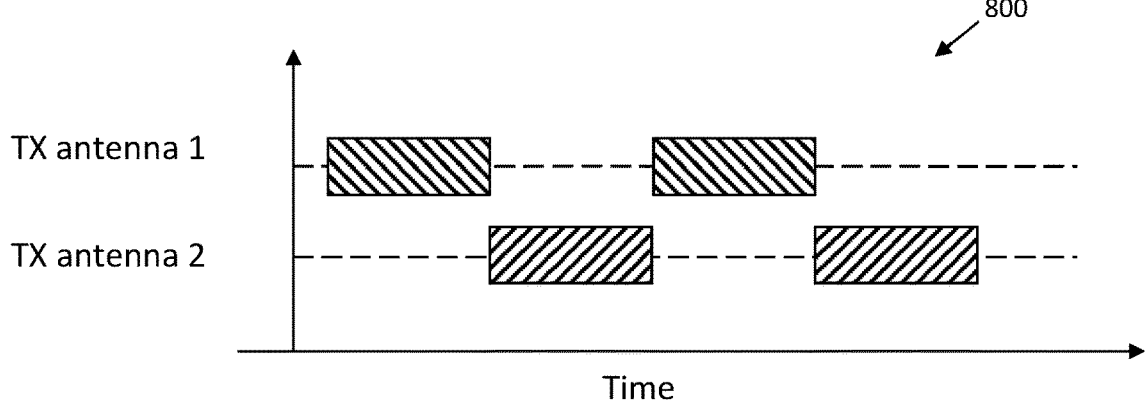
FIG. 8-11 show example transmission patterns in a LOS-MIMO system.

According to a second example, the system may synchronously switch between transmitting using antenna 1 and 2 in a time-interleaved fashion, to detect changes on all possible paths in the channel as seen in FIG. 8.

Figure 9:
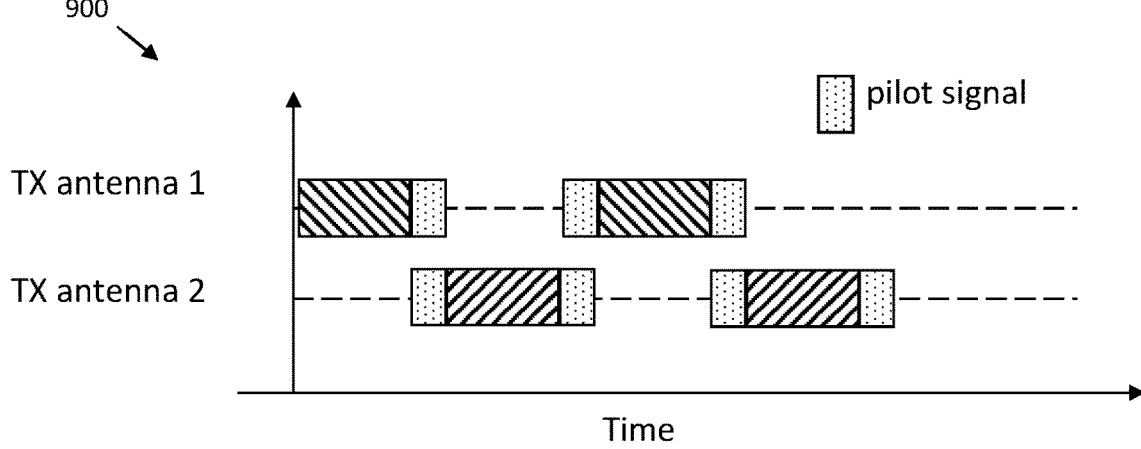

According to a third example, the system may synchronously switch between transmitting using antenna 1 and 2 in a time-interleaved fashion and transmit for a period with both antennas at the same time to detect changes on all possible paths in the channel as seen in FIG. 9. During the simultaneous transmission, both antennas can transmit pilot signals to be used to estimate the channel. Pilot signals are generally known and will therefore not be discussed in more detail herein. They are easier to detect compared to the standard MIMO signals transmitted over the LOS-MIMO radio link. Some pilot signals are a-priori known at the receiver side, while some other pilot signals are modulated using special modulation formats that are more easily detected at the receiver side.

Figure 10:
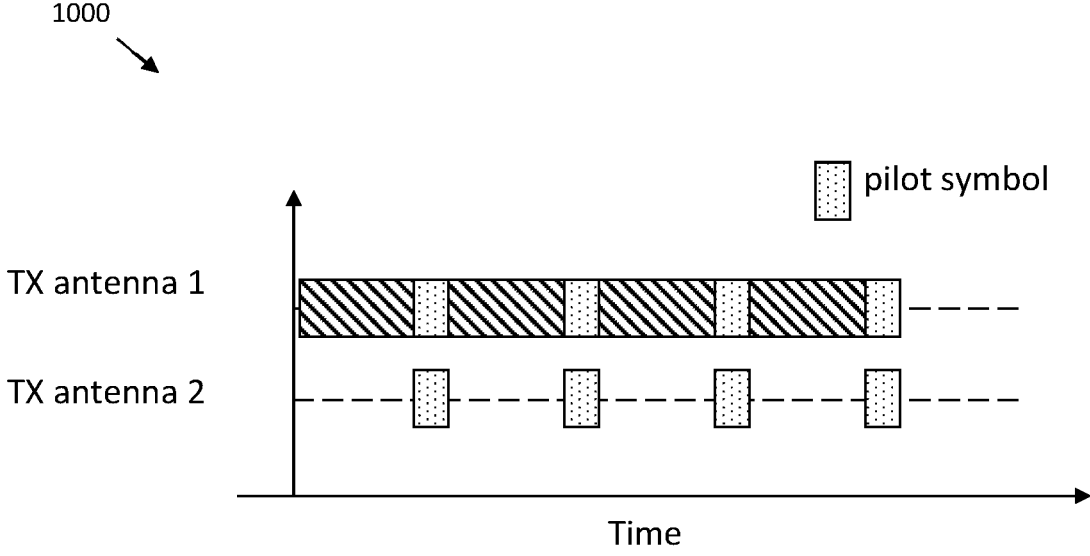

According to a fourth example, the system may transmit interleaved data and pilots on one stream, and pilots on the other stream as shown in FIG. 10. This is done to both allow for the estimation of the channel during the pilot sequence for switching back to MIMO as well as preparing the equalizer coefficients for after the switch, thus minimizing downtime.

Figure 11:
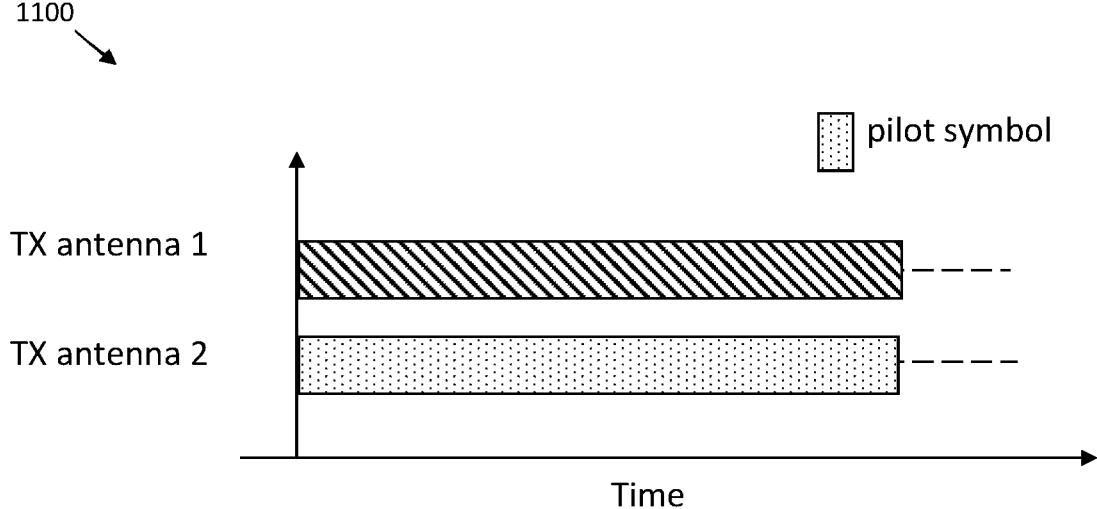

According to a fifth example, the system may transmit data on one stream and only pilots on the other stream as shown in FIG. 11. Since the pilots are known at the receiver, they can perfectly remove from the data, without degrading the capacity. At the same time, the 2 streams can be used to for the estimation of the channel for switching back to MIMO as well as preparing the equalizer coefficients for after the switch, thus minimizing downtime.

FIG. 14 is a flow chart which summarizes the procedure illustrated by the examples in FIGS. 6-11. There is illustrated a computer-implemented method, performed in a network node 110, 120, 160, 170, 180, 300, for estimating a LOS-MIMO radio propagation channel condition. The LOS-MIMO radio link 111, 166 is arranged to communicate a nominal number of MIMO data streams over the radio link from a first site to a second site. The nominal number of MIMO data streams may for instance equal the smallest number of antenna elements at the first site and at the second site, which as mentioned above limits the maximum LOS-MIMO channel rank. The determined radio propagation channel condition can advantageously be used when performing aspects of the method illustrated in FIG. 13, i.e., to determine a suitable number of MIMO data streams to communicate over the LOS-MIMO radio link from the first site to the second site. The method comprises configuring Sb1 the LOS-MIMO radio link 111, 166 to communicate a reduced number of MIMO data streams smaller than the nominal number of MIMO data streams over the radio link. This configuration may for instance be the result of an operation by the MIMO order decision module 300 discussed above in connection to FIG. 3. The method also comprises transmitting Sb2 the reduced number of MIMO data streams from the first site to the second site, and determining Sb3 a LOS-MIMO channel phase condition at the second site, based on the reduced number of MIMO data streams transmitted from the first site. This determination can be done in several different ways, which can also be combined for additional robustness. The method may for instance comprise transmitting Sb21 the reduced number of MIMO data streams from the first site to the second site as a time-interleaved transmission pattern over the transmit antennas at the first site, as illustrated in FIG. 8, and/or periodically transmitting Sb22 time-overlapping pilot signals from at least two transmit antennas at the first site as illustrated in FIG. 9, and/or transmitting Sb23 a MIMO data stream from one transmit antenna at the first site and a pilot signal from another transmit antenna at the first site, as schematically illustrated in FIG. 10 and in FIG. 11. These transmission schemes were discussed in detail above and will therefore not be discussed again here. The method also comprises communicating Sb4 the determined LOS-MIMO channel phase condition from the second site to the first site, and estimating Sb5 the LOS-MIMO radio propagation channel condition at the first site based on the LOS-MIMO channel phase condition communicated from the second site.

The LOS-MIMO channel phase condition may for instance be determined Sb31 by correlating a LOS-MIMO radio signal received at one antenna to a corresponding LOS-MIMO radio signal received at another antenna of the second site. This correlation will indicate the relative phase shift between the two signals, and also the relative amplitudes. This approach can be generalized in a straight-forward manner to systems comprising more than two antennas at the first and the second site. Both the phase relationship between the two or more signals and the amplitude relationship have an impact on LOS-MIMO channel performance, as discussed above.

The method may also comprise determining Sb32 the LOS-MIMO channel phase condition by correlating a detected LOS-MIMO data stream to a LOS-MIMO radio signal received at one antenna and to a corresponding LOS-MIMO radio signal received at another antenna of the second site. The detected LOS-MIMO data stream then represents a reference signal to which the two or more received signals can be compared, from which comparison the relative phases and the relative amplitudes of the received signals can be compared to each other. As discussed above, acceptance criteria can be formulated against which the phase and/or amplitude relations can be compared. This information can then be used by, e.g., a MIMO order decision module such as that discussed in connection to FIG. 3, or by some other form of control unit or system wanting to determine a current operating condition of the LOS-MIMO radio link.

The method illustrated in FIG. 14 optionally comprises communicating Sb41 the determined LOS-MIMO channel phase condition from the second site to the first site periodically, which means that the site at the other end periodically received information related to the LOS-MIMO channel phase condition. This information can then be used to determine, e.g., when an increase in the number of active MIMO data streams can be triggered. In this regard it is noted that detecting when to reduce the number of active MIMO data streams is relatively straight forwards since the streams are active which means that performance metrics such as MSE and the like can be observed. However, it may be more difficult to determine the future performance of an additional MIMO data stream which has not yet been activated. The method illustrated in FIG. 14 provides a mechanism which can be used with advantage to determine when additional MIMO data streams can be activated.

The method optionally comprises filtering Sb42 the LOS-MIMO channel phase condition prior to communicating the LOS-MIMO channel phase condition from the second site to the first site. This filtering removes spurious effects and distortion from the data communicated over the hop, which simplifies interpretation of the communicated channel phase condition data. The applied filtering may, for instance, comprise a low-pass filtering to suppress high frequency components in the data which are most likely due to noise and other forms of distortions in the observed MIMO channel phase condition data.

Figure 7:
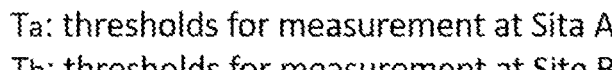
FIG. 7 illustrates phase thresholds for operating an example LOS-MIMO system.
Figure 7:
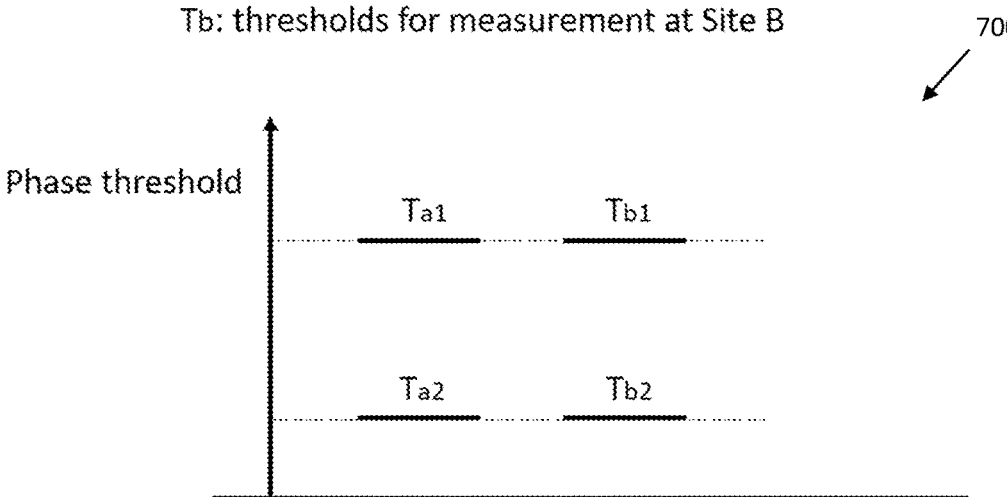

The method may also comprise comparing Sb43 the determined LOS-MIMO channel phase condition to a pre-determined acceptance criterion, and communicating the result of the comparison from the second site to the first site. With reference to FIG. 7, a preferred implementation of the method comprises comparing the determined LOS-MIMO channel phase condition determined at the first site to a first pre-determined acceptance criterion, and then comparing the determined LOS-MIMO channel phase conditions from both the first and the second site to a second pre-determined acceptance criterion which considers both metrics in combination.

The method may also comprise communicating Sb44 any of; an equalizer setting of the second site, an MSE measured at the second site, a BER measured at the second site, a PER measured at the second site, and an RSS of the second site to the first site, in order to complement the LOS-MIMO channel phase data. This way more information becomes available at the first site.

As discussed above in connection to FIG. 6, the method may also comprise communication in the reverse direction, i.e., transmitting Sb61 a reduced number of MIMO data streams from the second site to the first site, determining Sb62 a LOS-MIMO channel phase condition at the first site, based on the reduced number of MIMO data streams transmitted from the second site, communicating Sb63 the determined LOS-MIMO channel phase condition from the first site to the second site, and estimating Sb64 the LOS-MIMO radio propagation channel condition at the second site based on the LOS-MIMO channel phase condition communicated from the first site.

The method optionally also comprises adjusting Sb7 the number of active MIMO data streams sent over the LOS-MIMO radio link based on the estimated LOS-MIMO radio propagation channel condition and in some cases also requesting Sb8 a LOS-MIMO channel condition report from the second site by triggering transmission of a request message from the first site.

Figure 12:
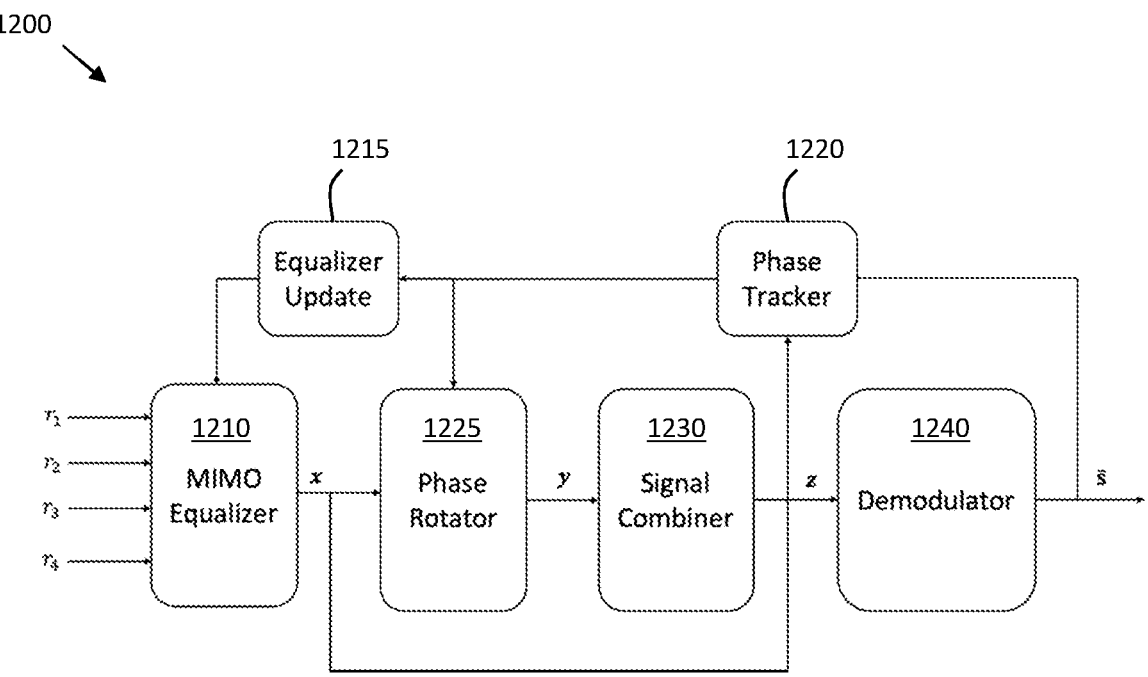
FIG. 12 schematically illustrates an example LOS-MIMO receiver.

FIG. 12 schematically illustrates the functions of an example LOS-MIMO receiver 1200. A MIMO equalizer 1210 is first applied to compensate for the effects of the channel, H. Several different types of MIMO equalizers are known, e.g., least mean squared (LMS) trained equalizers, zero-forcing (ZF) equalizer, minimum-mean-squared-error (MMSE) equalizer, and so on. An LMS-trained equalizer based on an MN×1 vector of finite impulse response (FIR) filters, has coefficients $w_k = \text{vec}(W_k)$ at time k which are updated as $$w_k = w_{k-1} - \mu\left(1_M^T \otimes r_{k-1}\right) \odot \left[w_{k-1}^* \left(1_M^T \otimes r_{k-1}\right) - 1_M^T \otimes \hat{s}_{k-1}\right]$$

where $\mu$ is a step size, $$1_M^T$$

is an M×1 vector of all ones, $\odot$ is element-wise multiplication, $\otimes$ denotes Kronecker product, $\hat{s}_{k-1}$ is the demodulated signals (i.e., estimates of the transmitted information symbols). In the training phase, the true transmitted signal $s_{k-1}$ can be used. Blind acquisition based on constant modulus, or the like can also be used. MIMO equalizers are generally known and will therefore not be discussed in more detail herein. The update algorithm is executed in the equalizer update module 1215.

The output x from the equalizer 1210 in FIG. 12 is then fed to a phase rotator module 1225 which applies a high bandwidth phase compensation to the received signal based on estimates of system phases determined by a phase tracking module 1220. This is mainly done to compensate for the fast phase perturbation introduced by the transmit side and receive side oscillators discussed above.

The output y from the phase rotator 1225 is then fed to a signal combiner 1230 and then on to a demodulator 1240 which generates estimates of the transmitted information symbols. According to an example, the demodulator performs an optimization over the transmission symbol alphabet $\mathbb{S}$ $$\hat{s}_k = \underset{s_k \in \mathbb{S}}{\text{argmin}} |z_k - s_k|$$

where $\mathbb{S}$ is $2^Q$ possible transmitted information symbols, where Q is the modulation index.

When switching from full-rank MIMO mode to SIMO mode or at least to an operating state where fewer than the nominal number of MIMO data streams are active and when switching back on one or more MIMO data streams, an abrupt change in operating conditions for the receiver results. This abrupt change in operating state is likely to cause interference to the already active MIMO data stream(s) until the MIMO equalizer 1201 and other adaptive signal processing functions converge. This means that there is a risk of creating a short-term outage while the signal processing functions 1210, 1225, 1230 are adapting from one MIMO operational point to another MIMO operational point with respect to the number of active MIMO data streams. There is a need for methods to enable smooth/seamless switching from one MIMO operational point to another MIMO operational point with respect to the number of active MIMO data streams, e.g., in response to an updated request from the MIMO order decision module 300.

The proposed solution to the issues related to signal processing function convergence comprises starting with a lower power on the new MIMO data stream(s), i.e., those recently activated, to limit the potential interference to the already running MIMO data streams, and increase the power gradually such that the various signal processing functions in the receiver architecture has enough time to acquire the necessary signals and to converge to the desired operating point. At the same time, in order to ensure no outage on the already active MIMO data stream(s), they are preferably switched to a lower order modulation before turning other MIMO data stream(s) on and then resuming to the normal modulation once the receiver functions have converged.

According to a first example, there is a dedicated control unit arranged to control at least parts of the functionality of the LOS-MIMO radio link system, which has the functionality to control the number of active MIMO data streams over the radio link hop. The control unit can, for instance, be used for switching between sub-rank MIMO (where less than the nominal number of MIMO data streams are active) and full-rank MIMO modes (where the nominal number of MIMO data streams are active). This control unit can, e.g., be integrated with the MIMO order decision module 300, or be realized separate from the MIMO order decision module 300. Each site of a microwave hop can be equipped with an operation mode switching control unit, and the operation mode switching control functions at the two sites can then be realized independently from each other. Alternatively, a single switching control function controls the activation and deactivation of MIMO data streams over the hop. It is noted that, generally, the number of active MIMO data streams from site A to site B of a microwave radio link need not be the same as the number of active MIMO data streams in the reverse direction from site B to site A. Both MIMO channel phase as well as interference conditions may vary in the two opposite directions.

According to a second example, there is a feedback channel between control units of the two sides of a radio link hop. In a related embodiment, the feedback signaling over the hop is periodic. In another related embodiment, the feedback can be event-triggered, e.g., triggered by a request from the other side.

According to a third example, the control unit on the transmit side lowers the modulation format on the already running MIMO data streams before turning on additional MIMO data streams. In one related embodiment, the determination of modulation step-down is based on one of MSE, or SNR, or SINR etc, over the feedback channel. The modulation can of course always also be stepped down to the lowest modulation which is supported by the system.

According to a fourth example, the control unit on the transmit side can activate additional MIMO data streams with a lower power compared to the already active MIMO data streams and then gradually increase the power to normal levels. In one embodiment, the determination of the power level to use is according to a pre-defined table.

FIG. 15 shows a flow chart that illustrates a computer-implemented method, performed in a network node 110, 120, 160, 170, 180, 300, for activating or deactivating transmission of a MIMO data stream in a LOS-MIMO system, from a first site to a second site. The method comprises configuring Sc1 a nominal output power setting of a transmitted MIMO data stream at the first site. This nominal output power setting may, for instance, be configured in dependence of a radio link hop distance to provide sufficient RSS at the receiver site, and/or in dependence of a desired radio link performance, and/or simply as a maximum available power output. The nominal output power can also be configured as part of an adaptive transmit power control (ATPC) operation. The nominal output power setting may also be determined in dependence of a non-linearity characteristic of a power-amplifier of the LOS-MIMO radio link system, such as to not generate excessive non-linear distortion in the transmitted signal.

The method also comprises obtaining Sc2 a request for activation of an additional MIMO data stream. This request may, for instance, have originated at a MIMO order decision module 300 such as the module discussed above in connection to FIG. 3. The request may also have originated as a result of determining the LOS-MIMO channel phase condition, as was discussed above in connection to, e.g., FIG. 7.

In order to spare the receiver from the otherwise abrupt onset of MIMO interference, the method comprises configuring Sc3 a reduced output power setting at the first site below the nominal output power setting, and initially transmitting Sc6 the additional MIMO data stream at the reduced output power setting from the first site. This means that the receiver will initially receive MIMO interference from the additional data stream, allowing the different signal processing functions at the receiver to acquire the new data stream, and allow its adaptive functions to converge to the new LOS-MIMO communication conditions over the microwave radio link. Some different signal processing functions which may converge better due to the application of the method were discussed above in connection to FIG. 12.

According to some aspects, the method comprises obtaining Sc31 the reduced output power setting from a pre-determined look-up table of output power settings. This look-up table may for instance be configured based on previous computer simulation of a LOS-MIMO radio link similar to the present LOS-MIMO system. The look-up table may also be adapted over time as the LOS-MIMO system operates, i.e., the output power settings in the predetermined look-up table may be decreased if the receiver reports initial high MIMO interference causing issues as the additional MIMO data stream is activated, and increased if the receiver reports that the new MIMO data stream was handled with sufficient margins in, e.g., MSE.

The method optionally comprises transmitting Sc4 a message to the second site indicative of an imminent activation of the additional MIMO data stream at the first site. This message allows the receiver to prepare for the additional MIMO data stream, which is likely to cause interference to the other MIMO data streams already being communicated over the microwave radio link. It may for instance be advisable to adjust Sc41 a configuration of a LOS-MIMO receiver at the second site in response to the message indicative of imminent activation of the additional MIMO data stream. This configuration may comprise configuring an increased adaptation bandwidth by the different adaptive signal processing functions, such as the MIMO equalizer 1210 and the phase rotator 1225 discussed above in connection to FIG. 12.

According to other aspects, the method also comprises reconfiguring Sc5 a modulation format order of one or more MIMO data streams transmitted from the first site prior to initially transmitting the additional MIMO data stream at the reduced output power setting from the first site. This reconfiguration of modulation format may for instance involve reduction of QAM order to increase the distance from the MSE level to the detection threshold. The reconfiguration may also involve activating signal constellations which are particularly resilient to LOS-MIMO interference, such as a quadrature phase shift keying (QPSK) modulation.

The method optionally also comprises obtaining Sc51 data indicative of a current operating condition of the LOS-MIMO receiver at the second site, and reducing Sc52 the modulation format order by an amount determined in dependence of the current operating condition. By reducing modulation format, the LOS-MIMO radio link becomes more robust to degradations in the operating conditions of the LOS-MIMO radio link, such as poor MIMO channel phase conditions and/or gain imbalances in the channel matrix H, as discussed above. The operating condition may comprise any of an equalizer setting of the second site, mean-squared error, MSE, of the second site, a bit error rate, BER, of the second site, a packet error rate, PER, of the second site to the first site, and a received signal strength, RSS, of the second site, as discussed above.

According to other aspects, the method comprises increasing Sc61 the output power of the additional MIMO data stream at the first site from the reduced output power setting to the nominal output power setting at a predetermined rate. This may be important in case the receiver signal processing functions are not able to adapt to fast changes in the MIMO interference conditions of the radio link. By increasing output power at a predetermined rate configured in dependence of the capabilities to adjust signal processing functions at the LOS-MIMO receiver, the activation of the additional MIMO data stream is facilitated.

The method optionally also comprises obtaining Sc7 a request for deactivation of a first MIMO data stream transmitted from the first site, and gradually reducing Sc8 an output power of the first MIMO data stream to be deactivated, prior to ceasing transmission of the first MIMO data stream from the first site. This gradual reduction in output power allows the LOS-MIMO receiver functions to gradually adjust to the new operating conditions where the MIMO data streams are reduced in number. An abrupt cessation of transmission in one or more MIMO data streams may cause detection errors at the receiver, which is undesired.

Figure 16:
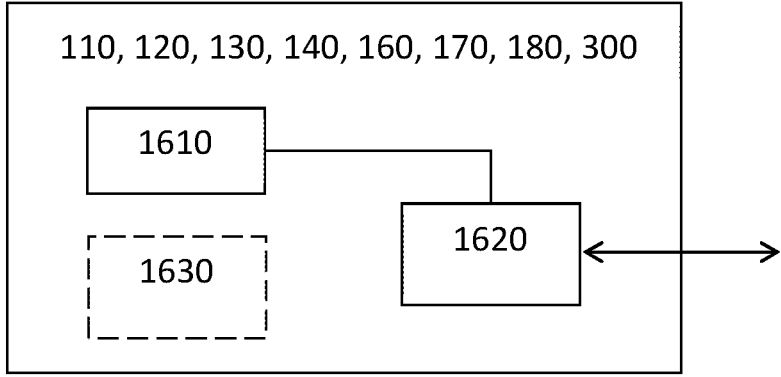
FIG. 16 schematically illustrates processing circuitry.

FIG. 16 schematically illustrates, in terms of a number of functional units, the general components of a network node 110, 120, 160, 170, 180, 300 according to embodiments of the discussions herein. Processing circuitry 1610 is provided using any combination of one or more of a suitable central processing unit CPU, multiprocessor, microcontroller, digital signal processor DSP, etc., capable of executing software instructions stored in a computer program product, e.g. in the form of a storage medium 1630. The processing circuitry 1610 may further be provided as at least one application specific integrated circuit ASIC, or field programmable gate array FPGA.

Particularly, the processing circuitry 1610 is configured to cause the node to perform a set of operations, or steps, such as the methods discussed in connection to FIGS. 13-15 and the discussions above. For example, the storage medium 1630 may store the set of operations, and the processing circuitry 1610 may be configured to retrieve the set of operations from the storage medium 1630 to cause the device to perform the set of operations. The set of operations may be provided as a set of executable instructions. Thus, the processing circuitry 1610 is thereby arranged to execute methods as herein disclosed. In other words, there is shown a network node 110, 120, 160, 170, 180, 300 comprising processing circuitry 1610, a network interface 1620 coupled to the processing circuitry 1610 and a memory 1630 coupled to the processing circuitry 1610, wherein the memory comprises machine readable computer program instructions that, when executed by the processing circuitry, causes the network node to transmit and to receive a radio frequency waveform over a propagation channel 111, 145, 165, 166.

The storage medium 1630 may also comprise persistent storage, which, for example, can be any single one or combination of magnetic memory, optical memory, solid state memory or even remotely mounted memory.

The node 110, 120, 160, 170, 180, 300 may further comprise an interface 1620 for communications with at least one external device. As such the interface 1620 may comprise one or more transmitters and receivers, comprising analogue and digital components and a suitable number of ports for wireline or wireless communication.

The processing circuitry 1610 controls the general operation of the node 110, 120, 160, 170, 180, 300, e.g., by sending data and control signals to the interface 1620 and the storage medium 1630, by receiving data and reports from the interface 1620, and by retrieving data and instructions from the storage medium 1630. Other components, as well as the related functionality, of the control node are omitted in order not to obscure the concepts presented herein.

Figure 17:
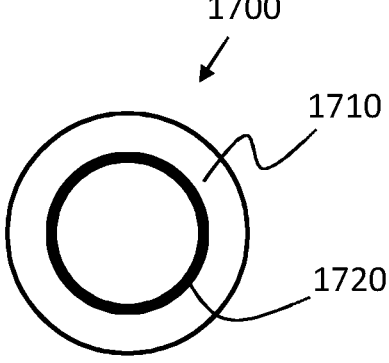
FIG. 17 shows a computer program product.

FIG. 17 illustrates a computer readable medium 1710 carrying a computer program comprising program code means 1720 for performing the methods illustrated in, e.g., FIGS. 13-15, when said program product is run on a computer. The computer readable medium and the code means may together form a computer program product 1700.

The invention claimed is:

1. A computer-implemented method, performed in a network node, for estimating a line-of-sight, LOS, multiple-input multiple-output, MIMO, radio propagation channel condition, wherein a LOS-MIMO radio link is arranged to communicate a nominal number of MIMO data streams over the radio link from a first site to a second site, the method comprising:

configuring the LOS-MIMO radio link to communicate a reduced number of MIMO data streams smaller than the nominal number of MIMO data streams from the first site to the second site over the radio link;

transmitting the reduced number of MIMO data streams from the first site to the second site;

determining a LOS-MIMO channel phase condition at the second site, based on the reduced number of MIMO data streams transmitted from the first site, communicating the determined LOS-MIMO channel phase condition from the second site to the first site; and estimating the LOS-MIMO radio propagation channel condition at the first site based on the LOS-MIMO channel phase condition communicated from the second site.

2. The method according to claim 1, further comprising: transmitting the reduced number of MIMO data streams from the first site to the second site as a time-interleaved transmission pattern over transmit antennas at the first site.

3. The method according to claim 1, further comprising: periodically transmitting time-overlapping pilot signals from at least two transmit antennas at the first site.

4. The method according to claim 1, further comprising: transmitting a MIMO data stream, of the reduced number of MIMO data streams, from one transmit antenna at the first site and a pilot signal from another transmit antenna at the first site.

5. The method according to claim 1, further comprising: determining the LOS-MIMO channel phase condition by correlating a LOS-MIMO radio signal received at one antenna to a corresponding LOS-MIMO radio signal received at another antenna of the second site.

6. The method according to claim 1, further comprising: determining the LOS-MIMO channel phase condition by correlating a detected LOS-MIMO data stream to a LOS-MIMO radio signal received at one antenna and to a corresponding LOS-MIMO radio signal received at another antenna of the second site.

7. The method according to claim 1, further comprising: communicating the determined LOS-MIMO channel phase condition from the second site to the first site periodically.

8. The method according to claim 1, further comprising: filtering the LOS-MIMO channel phase condition prior to communicating the LOS- MIMO channel phase condition from the second site to the first site.

9. The method according to claim 1, further comprising: comparing the determined LOS-MIMO channel phase condition to a pre-determined acceptance criterion, and communicating the result of the comparison from the second site to the first site.

10. The method according to claim 1, further comprising: communicating any of: an equalizer setting of the second site, mean-squared error, MSE, of the second site, a bit error rate, BER, of the second site, a packet error rate, PER, of the second site to the first site, and a received signal strength, RSS, of the second site.

11. The method according to claim 1, further comprising: transmitting a reduced number of MIMO data streams from the second site to the first site;

US 12,671,608 B2

27 determining a LOS-MIMO channel phase condition at the first site, based on the reduced number of MIMO data streams transmitted from the second site;

communicating, from the first site to the second site, the LOS-MIMO channel phase condition determined at the first site; and estimating the LOS-MIMO radio propagation channel condition at the second site based on the LOS-MIMO channel phase condition communicated from the first site.

12. The method according to claim 1, further comprising:

adjusting the number of active MIMO data streams sent over the LOS-MIMO radio link based on the estimated LOS-MIMO radio propagation channel condition.

13. The method according to claim 1, further comprising:

requesting a LOS-MIMO channel condition report from the second site by triggering transmission of a request message from the first site.

14. A network node for estimating a line-of-sight, LOS, multiple-input multiple-output, MIMO, radio propagation channel condition, wherein a LOS-MIMO radio link is arranged to communicate a nominal number of MIMO data streams over the radio link from a first site to a second site, the network node comprising:

28 processing circuitry;

a network interface coupled to the processing circuitry; and a memory coupled to the processing circuitry, wherein the memory comprises machine readable computer program instructions that, when executed by the processing circuitry, causes the network node to:

configure the LOS-MIMO radio link to communicate a reduced number of MIMO data streams smaller than the nominal number of MIMO data streams from the first site to the second site over the radio link;

transmit the reduced number of MIMO data streams from the first site to the second site;

determine a LOS-MIMO channel phase condition at the second site, based on the reduced number of MIMO data streams transmitted from the first site;

communicate the determined LOS-MIMO channel phase condition from the second site to the first site; and estimate the LOS-MIMO radio propagation channel condition at the first site based on the LOS-MIMO channel phase condition communicated from the second site.

* * * * *